United States Patent [19]
Hattori

[11] Patent Number: 6,034,718
[45] Date of Patent: Mar. 7, 2000

[54] METHOD AND APPARATUS FOR OBSERVING TIP PORTION OF OPTICAL FIBERS BUTTING EACH OTHER

[75] Inventor: Kazunari Hattori, Yokohama, Japan

[73] Assignee: Sumitomo Electric Industries, Ltd., Osaka, Japan

[21] Appl. No.: 08/847,333

[22] Filed: Apr. 23, 1997

[30] Foreign Application Priority Data

Apr. 23, 1996 [JP] Japan .................................. 8-101355

[51] Int. Cl.[7] .................................................. H04N 7/18
[52] U.S. Cl. ................................ 348/61; 348/64; 348/92; 348/95; 348/125; 356/73.1; 385/95; 385/96; 385/97; 385/98
[58] Field of Search ....................... 385/95–99; 356/73.1; 348/79, 90, 95, 61, 64, 92, 93, 94, 125; 382/141

[56] References Cited

U.S. PATENT DOCUMENTS

| | | | |
|---|---|---|---|
| 4,506,947 | 3/1985 | Tatekura et al. ........................ | 356/73.1 |
| 4,613,214 | 9/1986 | Brugger et al. . | |
| 4,978,201 | 12/1990 | Yamada et al. ........................... | 385/96 |
| 5,158,591 | 10/1992 | Onodera et al. ......................... | 356/73.1 |
| 5,179,419 | 1/1993 | Palmquist et al. ...................... | 356/73.1 |
| 5,339,380 | 8/1994 | Wysocki et al. ......................... | 385/136 |
| 5,384,870 | 1/1995 | Lieber ........................................ | 385/15 |
| 5,524,163 | 6/1996 | Kobayashi et al. ....................... | 385/96 |
| 5,533,160 | 7/1996 | Watanabe et al. ......................... | 385/96 |
| 5,561,728 | 10/1996 | Kobayashi et al. ........................ | 385/97 |
| 5,572,313 | 11/1996 | Zheng et al. ............................. | 356/73.1 |
| 5,611,015 | 3/1997 | Tokumaru et al. ....................... | 385/98 |
| 5,638,476 | 6/1997 | Zheng ....................................... | 385/96 |
| 5,677,973 | 10/1997 | Yuhara et al. ............................ | 385/90 |

FOREIGN PATENT DOCUMENTS

| | | | |
|---|---|---|---|
| 1-107218 | 4/1989 | Japan ................................ | G02B 6/24 |
| 02037306 | 2/1990 | Japan ............................. | G02B 6/255 |
| 7-84190 | 3/1995 | Japan ............................. | G02B 21/06 |
| 8-338921 | 12/1996 | Japan ............................. | G02B 6/255 |
| 09043447 | 2/1997 | Japan ............................. | G02B 6/255 |

*Primary Examiner*—Vu Le
*Attorney, Agent, or Firm*—Pillsbury Madison & Sutro LLP

[57] ABSTRACT

The present invention relates to a method and apparatus for observing, before and after fusion-splicing of optical fibers such as ribbon fibers each including a plurality of optical fibers in particular, the butting state of the tip portion of each of fiber ribbons in a wide range with a high accuracy. In the observation method in accordance with the present invention, while the optical fibers to be fusion-spliced together are disposed on a predetermined reference surface such that their end faces butt each other, at least a pair of cameras are independently or synchronously moved along a direction perpendicular to the longitudinal direction of the optical fibers so as to change the shooting areas of the respective cameras, thereby realizing the collective observation or local observation of the observation area. The observation apparatus in accordance with the present invention comprises a driving system for moving the pair of cameras along a predetermined direction.

20 Claims, 11 Drawing Sheets

METHOD AND APPARATUS FOR OBSERVING TIP PORTION OF OPTICAL FIBERS BUTTING EACH OTHER

BACKGROUND OF THE INVENTION

1. Field of the Invention

The present invention relates to a method and apparatus for observing, before and after fusion-splicing of optical fibers such as ribbon fibers each including a plurality of optical fibers in particular, the butting state of the tip portion of each of fiber ribbons in a wide range with a high accuracy. Here, the fusion-splicing of the fiber ribbons is effected as optical fibers in one fiber ribbon are fusion-spliced with the respective optical fibers in the other fiber ribbon in a state where end faces of the corresponding optical fibers butt each other.

2. Related Background Art

As optical communication networks expand, high-density multifilament fiber-optic cables have been used, thereby necessitating a method for connecting them together with a low loss, a high reliability, and a rapidness. From this viewpoint, fusion-splicing machines for fiber ribbons (also known as ribbon type optical fibers) constituting the high-density multifilament fiber-optic cables have been developed. Here, "fiber ribbon" refers to a tape-shaped fiber cord in which a plurality of optical fibers are unitedly coated with a resin or the like. Also, each optical fiber comprises a core region having a predetermined refractive index and a cladding region which covers the outer periphery of the core region and has a lower refractive index than the core region.

Figure 14:
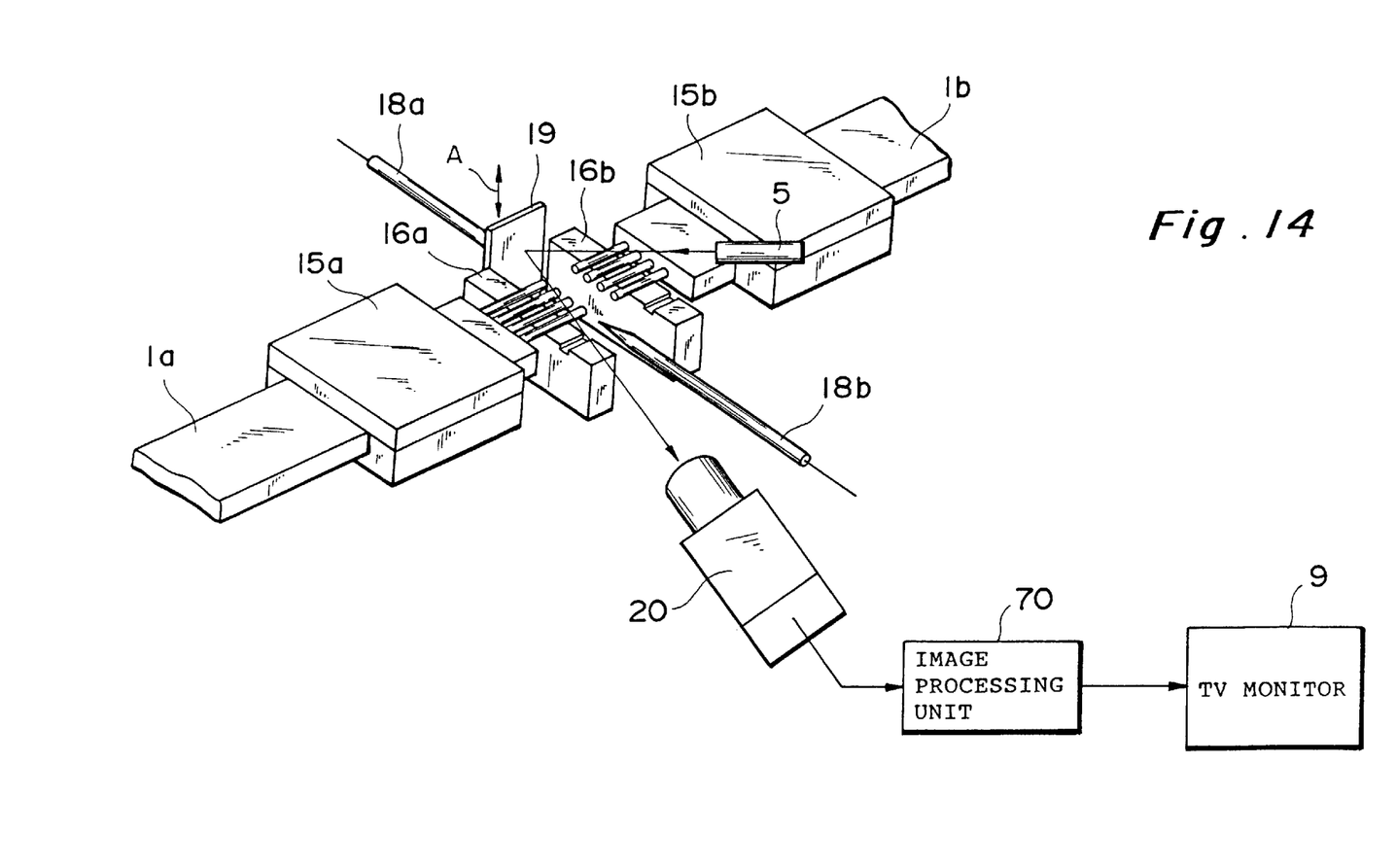
FIG. 14 is a view showing a configuration of the conventional observation apparatus.

FIG. 14 shows a configuration of the conventional fusion-splicing machine (including an observation apparatus) for fiber ribbons disclosed, for example, in U.S. Pat. No. 4,978, 201. Fiber ribbons 1*a* and 1*b* to be spliced together are respectively held by fiber holding members 15*a* and 15*b* at their tip portions. The respective tip portions of the fiber ribbons 1*a* and 1*b*, stripped of coatings, are fixed onto installation members 16*a* and 16*b*, each having a plurality of V-shaped grooves. Disposed on both sides of the installation members 16*a* and 16*b* are electrodes 18*a* and 18*b*. After each of the butting tip portions of the fiber ribbons 1*a* and 1*b* is observed, the fiber ribbons 1*a* and 1*b* are fusion-spliced together by discharge between the electrodes 18*a* and 18*b*. A mirror 19, which is disposed between the electrodes 18*a* and 18*b*, is movable along directions indicated by arrow A in this drawing. A light source 5 and a microscope camera 20 are disposed such that irradiation light from the light source 5 is reflected by a mirror 19 and then is made incident on the microscope camera 20.

Further, the image data captured by the microscope camera 20 by way of the mirror is temporarily taken into an image processing unit 70. The image of the butting tip portions of the fiber ribbons 1*a* and 1*b* are displayed on a TV monitor 9 by the image processing unit 70.

Figure 15:
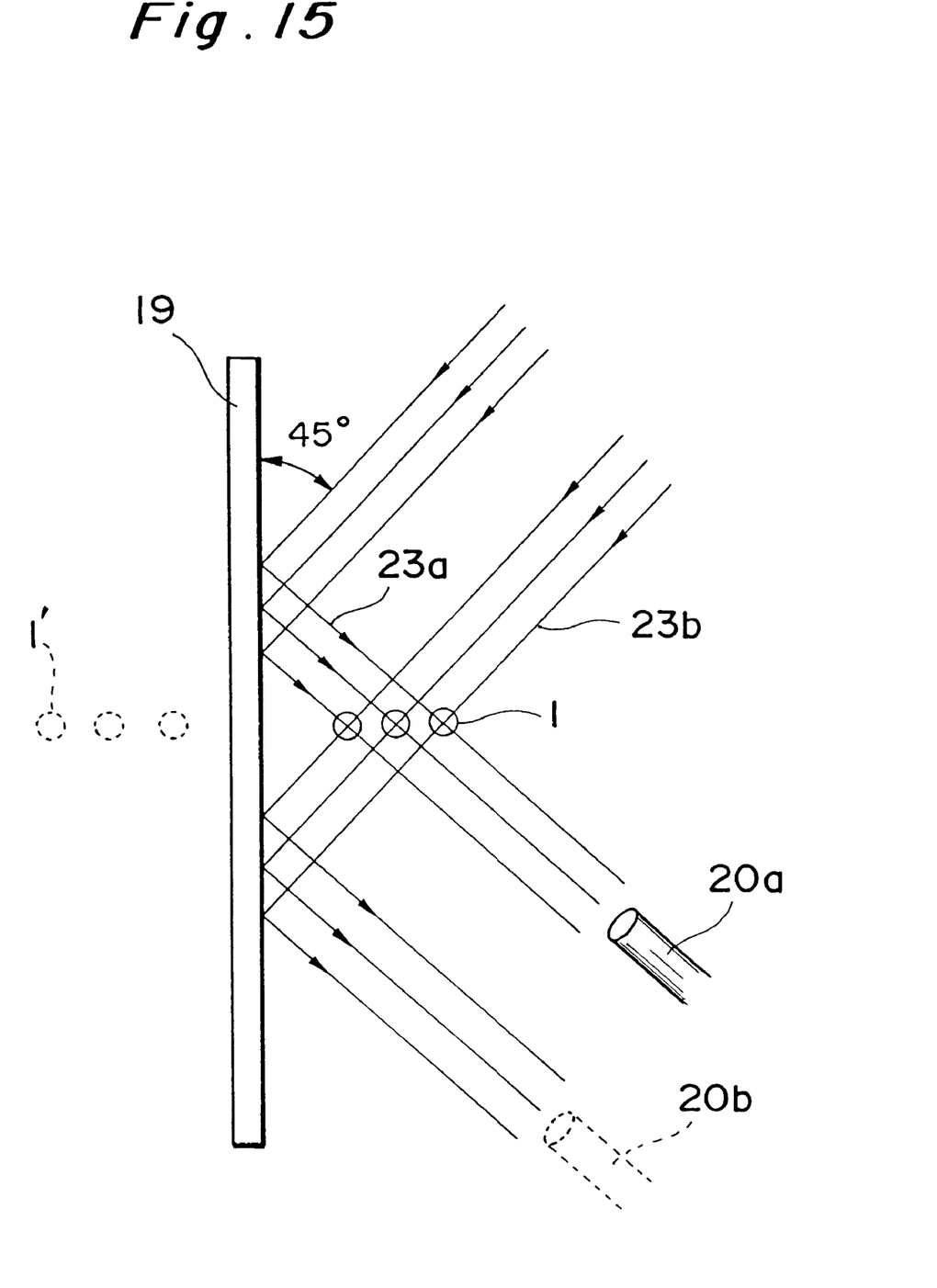
FIG. 15 is a view for explaining the conventional observation method.

Here, as shown in FIG. 15, after being reflected by the mirror 19, a part of the irradiation light from the light source 5 is transmitted through each optical fiber from the direction indicated by 23*a* so as to enter the microscope camera that has not yet been moved from its initial position 20*a*. On the other hand, a part of irradiation light from the moved light source 5 is transmitted through each optical fiber from the direction indicated by 23*b* in the drawing and then is reflected by the mirror 19 so as to enter the microscope camera that has been moved to a position denoted by 20*b*. In order to observe the butting state of the tip portions of the fiber ribbons 1*a* and 1*b*, the real images and virtual images of the tip portions of respective pairs of the optical fibers thus butting each other have been successively taken into the image processing unit 70 as image data while the microscope camera 20 is driven, or the real images and virtual images of the tip portions of a plurality of sets of optical fibers butting each other whose focal points do not considerably deviate from each other have been successively taken into the image processing unit 70 as image information.

SUMMARY OF THE INVENTION

The inventor has studied the above-mentioned prior art and, as a result, has found the problems explained in the following. As a recent tendency, the filament number (number of optical fibers included in a fiber ribbon) of each fiber ribbon (ribbon-type optical fiber) to be spliced has been doubling, e.g., from 8 to 16 and 12 to 24. In the case where the fiber ribbons each having such an increased filament number are to be observed, even when the observation and measurement accuracy can be maintained, a wide range of observation cannot be effected, thereby it takes a long time for the fiber ribbons to be completely spliced together.

Also, when the whole image of the tip portions of the respective fiber ribbons to be spliced together or image of the spliced portions of the respective fiber ribbons is to be displayed, since the side width (width in the direction orthogonal to the longitudinal direction of each optical fiber included in the fiber ribbon) increases, it is necessary for the magnification of the microscope camera to be lowered, thereby the resolution may deteriorate.

Further, as the side width of the fiber ribbon increases, the microscope camera has a larger field angle, thereby it is likely to become out of focus.

Here, known as technologies relating to the present invention are those disclosed in Japanese Patent Application Laid-Open Nos. 1-107218 and 7-84190, for example.

The present invention relates to a method and apparatus for observing, before and after fusion-splicing of optical fibers such as ribbon fibers each including a plurality of optical fibers in particular, the butting state of the tip portion of each of fiber ribbons in a wide range with a high accuracy. In particular, it is an object of the present invention to provide an observation method and observation apparatus which can observe the butting state of each set of optical fibers in a short time without lowering the observation and measurement accuracy even when the filament number in the fiber ribbons to be spliced together increases.

Here, the fusion-splicing of the fiber ribbons is effected as optical fibers in one fiber ribbon are fusion-spliced with the respective optical fibers in the other fiber ribbon in a state where end faces of the corresponding optical fibers butt each other.

In order to achieve the above-mentioned object, a first embodiment of the observation method in accordance with the present invention comprises, at least, the steps of disposing, while a tip portion of a first optical fiber (included in one fiber ribbon) and a tip portion of a second optical fiber (included in the other fiber ribbon to be spliced with the one fiber ribbon) butt each other, the tip portions of the first and second optical fibers onto a predetermined reference surface; and shooting an observation area on the reference surface from directions different from each other while moving a pair of microscope cameras (first and second cameras) along a direction perpendicular to a longitudinal direction of the first and second optical fibers disposed on the reference surface. Here, each of the first and second cameras is a microscope camera having an optical system with a predetermined magnification. In this observation method in accordance with the present invention, the above-mentioned image pick up step includes a collective observation step for shooting the whole observation area and a local observation step for shooting a part of the observation area.

Figure 4:
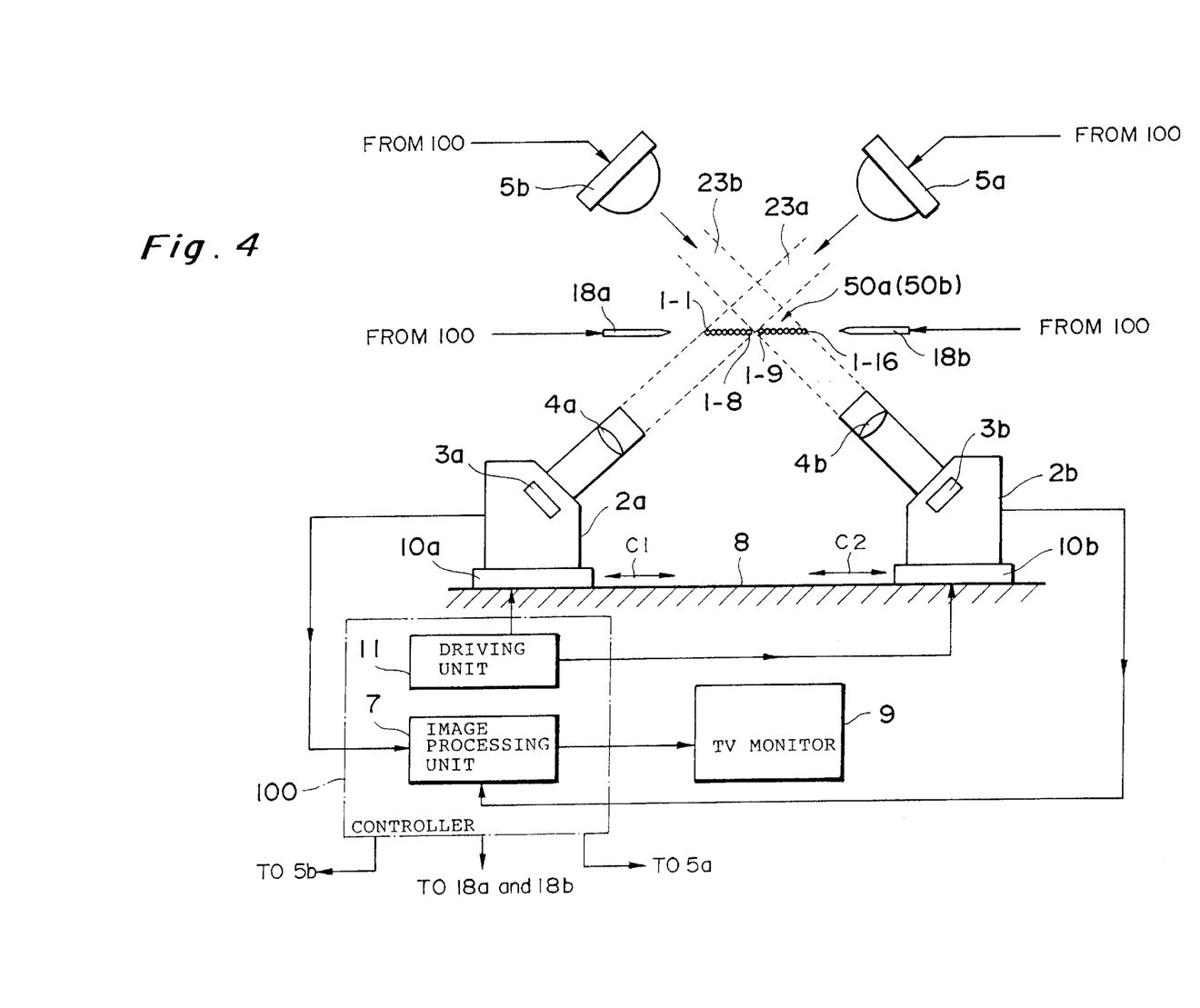
FIG. 4 is a view showing a part of the configuration for realizing a collective observation step included in the first embodiment of the observation method in accordance with the present invention in the observation apparatus shown in FIG. 1.
Figure 5A:
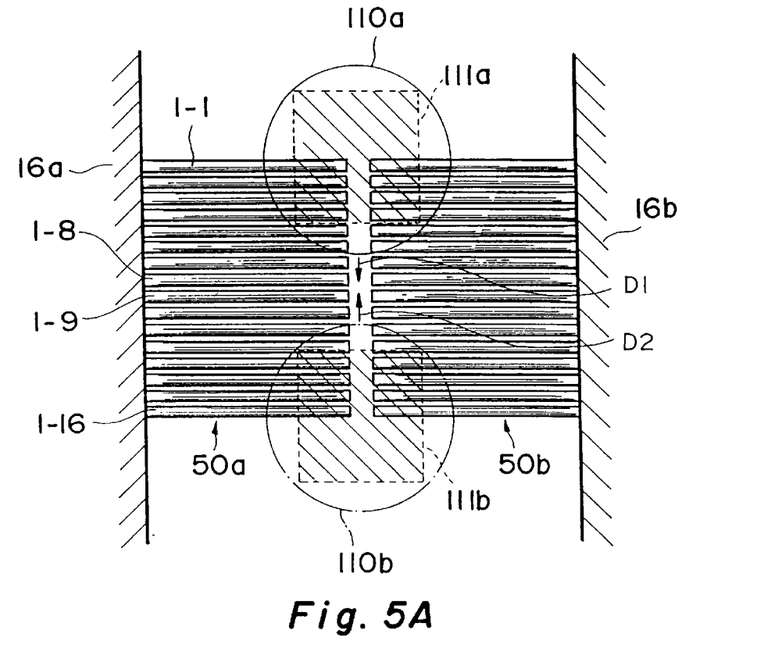
FIGS. 5 and 6 are views for explaining the collective observation step in the first embodiment of the observation method in accordance with the present invention.
Figure 5B:
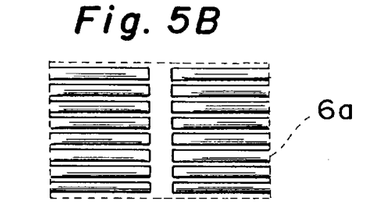
Figure 5C:
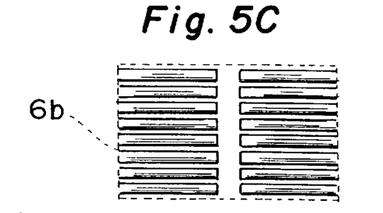

In particular, in a first movement control operation (collective observation step) for the above-mentioned pair of microscope cameras, the first and second cameras are moved in directions opposite to each other, which are perpendicular to the longitudinal direction of the first and second optical fibers, thereby the first and second cameras divisionally shoot the whole observation area (see FIGS. 4 and 5). Here, the movement control operations for the first and second cameras are executed independently of each other. Accordingly, at the collective observation step in the first embodiment, a first shooting area on the reference surface shoot by the first camera and a second shooting area on the reference surface shoot by the second camera are respectively scanned on the reference surface in directions opposite to each other, which are perpendicular to the longitudinal direction of the first and second optical fibers.

Figure 7:
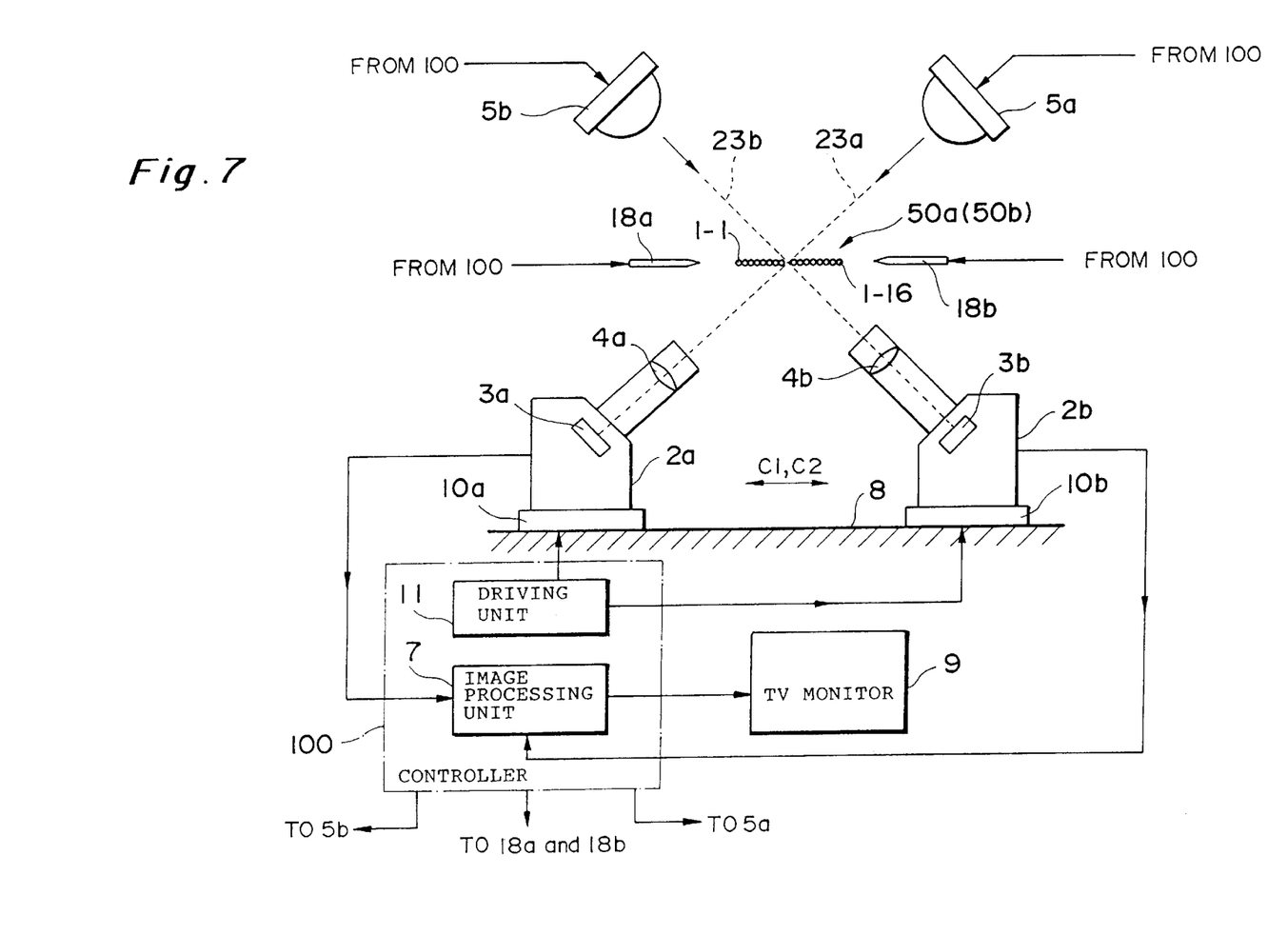
FIG. 7 is a view showing a part of the configuration for realizing a local observation step included in the first embodiment of the observation method in accordance with the present invention in the observation apparatus shown in FIG. 1.
Figure 8A:
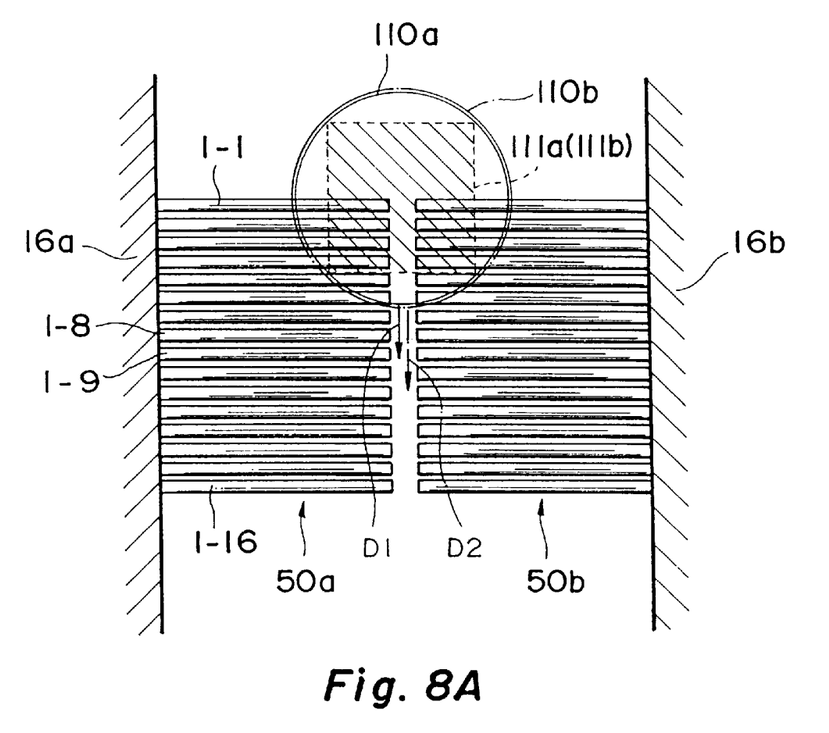
FIGS. 8 to 11 are views for explaining the local observation step in the first embodiment of the observation method in accordance with the present invention.
Figure 8B:
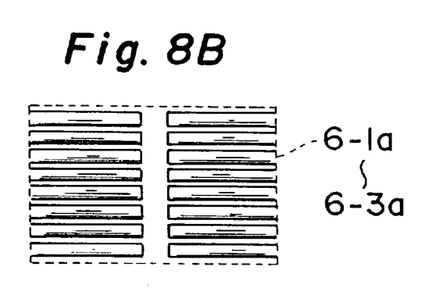
Figure 8C:
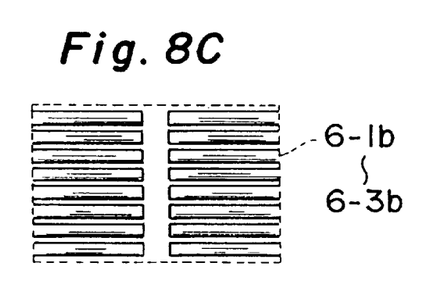

A second movement control operation (local observation step) for the above-mentioned pair of microscope cameras (first and second cameras) is executed such that the first and second cameras are moved in the same direction perpendicular to the longitudinal direction of the first and second optical fibers, while maintaining a state where the first shooting area on the reference surface shoot by the first camera and the second shooting area on the reference surface shoot by the second camera substantially coincide with each other (see FIGS. 7 and 8). Here, the first and second shooting areas are included in the observation area on the reference surface. Accordingly, at the local observation step in the first embodiment, the first and second shooting areas are scanned on the reference surface in the same direction.

Preferably, the pair of microscope cameras (first and second cameras) are moved along a direction perpendicular to the longitudinal direction of the first and second optical fibers, while maintaining a state where the optical axes of their respective optical systems are orthogonal to each other (see FIGS. 4 and 7).

An observation apparatus for realizing the above-mentioned first embodiment of the observation method in accordance with the present invention comprises, as shown in FIGS. 1 to 4 and 7 for example, at least, a pair of installation members 16a and 16b for holding, while a tip portion of a first optical fiber 50a (included in one fiber ribbon 1a) and a tip portion of a second optical fiber 50b (included in the other fiber ribbon 1b to be spliced with the one fiber ribbon 1a) butt each other, the tip portions of the first and second optical fibers 50a and 50b such that the tip portions of first and second optical fibers 50a and 50b are disposed on a predetermined reference surface P1; a first camera 2a and a second camera 2b for shooting an observation area on the reference surface P1 respectively from directions different from each other; and a driving system for moving the first camera 2a and second camera 2b along a direction perpendicular to a longitudinal direction of the first and second optical fibers 50a and 50b disposed on the reference surface P1. Here, the pair of installation members 16a and 16b respectively have faces 160a and 160b facing each other and perpendicular to the longitudinal direction of the first and second optical fibers 50a and 50b, as well as V-shaped grooves 161a and 161b for defining positions at which the optical fibers 50a and 50b are disposed. The first and second cameras 2a and 2b respectively have optical systems 4a and 4b with a predetermined magnification.

Figure 1:
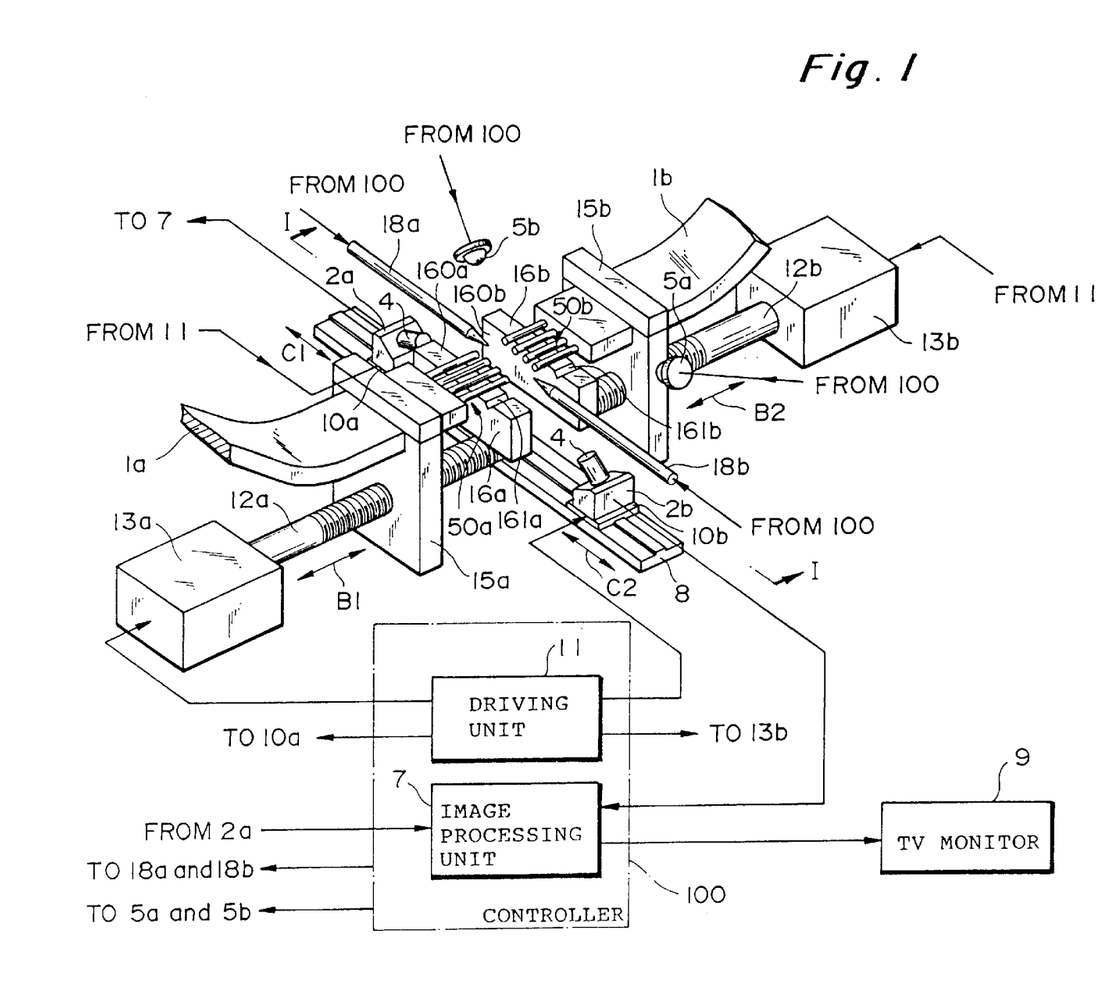
FIG. 1 is a perspective view showing a configuration of a fiber ribbon fusion-splicing machine including an observation apparatus in accordance with the present invention, the observation apparatus realizing a first embodiment of the observation method in accordance with the present invention.
Figure 2:
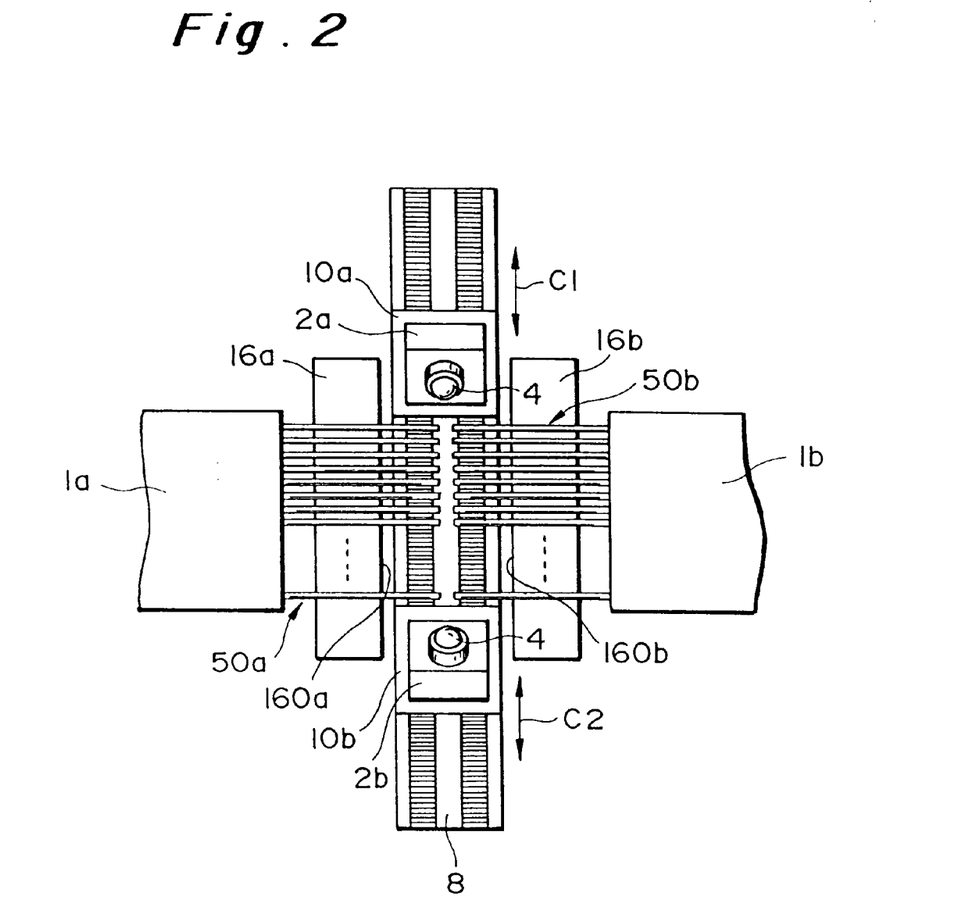
FIG. 2 is a view for explaining a part of a driving system of the observation apparatus shown in FIG. 1.

In particular, as shown in FIGS. 1 and 2, the above-mentioned driving system comprises, at least, a guide 8 extending along the faced surfaces 160a and 160b of the pair of installation members 16a and 16b; first and second drivers 10a and 10b which are movable on the guide 8; and a driving unit 11 for moving the first and second drivers 10a and 10b along a direction in which the guide 8 extends.

Here, the first driver 10a is loaded with the first camera 2a having the optical system 4a, whereas the second driver 10b is loaded with the second camera 2b having the optical system 4b. Preferably, the first and second cameras 2a and 2b are respectively mounted on the first and second drivers 10a and 10b such that the optical axes of their optical systems 4a and 4b are orthogonal to each other.

In the observation apparatus, in order to realize the above-mentioned first embodiment (including the collective observation step and the local observation step) of the observation method, the first and second cameras 2a and 2b are disposed along a direction perpendicular to the longitudinal direction of the first and second optical fibers 50a and 50b. Further in the local observation step, the driving unit 11 moves and controls the first and second drivers 10a and 10b such that the first shooting area on the reference surface P1 shoot by the first camera 2a and the second shooting area on the reference surface P1 shoot by the second camera 2b substantially coincide with each other. Here, the first and second shooting areas are included in the observation area on the reference surface P1.

The observation apparatus further comprises a first light source 5a disposed at a position opposing the first camera 2a with respect to the reference surface P1 and a second light source 5b disposed at a position opposing the second camera 2b with respect to the reference surface P1. The first and second cameras 2a and 2b are respectively equipped with light receiving sections 3a and 3b for taking out images of the observation area on the reference surface P1 as electric signals through the optical systems 4a and 4b with a predetermined magnification.

Also, the observation apparatus comprises an image processing system including a monitor 9 for displaying, at least, an image of the observation area on the reference surface P1 and an image processing unit 7 for, at least, receiving a first image data obtained by the light receiving section 3a of the first camera 2a and a second image data obtained by the light receiving section 3b of the second camera 2b and forming, from thus received first and second image data, a composite image to be displayed on the monitor 9.

The next observation method (second embodiment) in accordance with the present invention comprises, at least, the steps of disposing, while a tip portion of a first optical fiber (included in one fiber ribbon) and a tip portion of a second optical fiber (included in the other fiber ribbon to be spliced with the one fiber ribbon) butt each other, the tip portions of the first and second optical fibers onto a predetermined reference surface; shooting an observation area on the reference surface, as a whole, including the tip portions of the first and second optical fibers by a collective observation microscope camera (first camera) having an optical system with a predetermined magnification (collective observation step); and shooting a predetermined area in the observation area from directions different from each other while moving a pair of microscope cameras (second and third cameras) having optical systems with a magnification greater than the magnification of the optical system of the collective observation microscope camera along a direction perpendicular to a longitudinal direction of the first and second optical fibers disposed on the reference surface.

In particular, in this second embodiment, at least the second and third cameras are preferably moved in the same direction perpendicular to the longitudinal direction of the first and second optical fibers, while maintaining a state where the first shooting area (included in the observation area) on the reference surface shoot by the second camera and the second shooting area (included in the observation area) on the reference surface shoot by the third camera substantially coincide with each other. Also, the second and third cameras are moved along the longitudinal direction of the first and second optical fibers while maintaining a state where the optical axes of their optical systems are orthogonal to each other.

Figure 3:
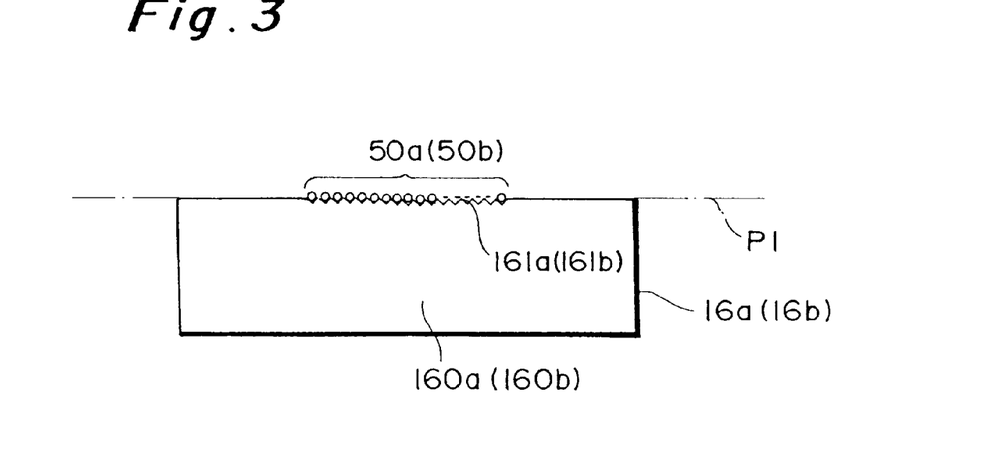
FIG. 3 is a view for explaining a state in which optical fibers to be fusion-spliced are disposed.

The observation apparatus for realizing the above-mentioned observation method (second embodiment) characteristically comprises, in place of the pair of cameras 2a and 2b of the observation apparatus shown in FIGS. 1 to 3, a collective observation microscope camera (first camera 2c) and a pair of microscope cameras (second camera 2d and third camera 2e), respectively having optical systems 4c to 4e, while the magnification of the optical system 4c differs from that of the optical systems 4d and 4e.

Namely, the observation apparatus for realizing the above-mentioned observation method (second embodiment) in accordance with the present invention comprises, at least, the pair of installation members 16a and 16b for holding, while the tip portion of the first optical fiber 50a (included in one fiber ribbon 1a) and the tip portion of the second optical fiber 50b (included in the other fiber ribbon 1b to be spliced with the one fiber ribbon 1a) butt each other, the tip portions of the first and second optical fibers 50a and 50b such that the tip portions of first and second optical fibers 50a and 50b are disposed on the predetermined reference surface P1; the first camera (collective observation microscope camera) 2c having the optical system 4c with a predetermined magnification for shooting, as a whole, an observation area on the reference surface P1 including the tip portions of the first and second optical fibers 50a and 50b disposed on the reference surface P1; a pair of microscope cameras (second camera 2d and third camera 2e) for shooting a predetermined area in the observation area on the reference surface P1 respectively from directions different from each other; and a driving system for moving at least the second camera 2d and third camera 2e disposed on the reference surface P1 along a direction perpendicular to the longitudinal direction of the first and second optical fibers 50a and 50b disposed on the reference surface P1. Here, the pair of the installation members 16a and 16b respectively have the faces 160a and 160b facing each other and perpendicular to the longitudinal direction of the first and second optical fibers 50a and 50b, as well as the V-shaped grooves 161 and 161b for defining positions at which the optical fibers 50a and 50b are disposed. The second and third cameras 2d and 2e respectively have the optical systems 4d and 4e with a magnification greater than the that of the optical system 4c of the first camera 2c.

The above-mentioned driving system comprises, at least, the guide 8 extending along the faced surfaces 160a and 160b of the pair of installation members 16a and 16b; a driver 10 which is movable on the guide 8; and the driving unit 11 for moving the driver 10 along a direction in which the guide 8 extends. Here, in order to reduce the size of the observation apparatus, it is preferable that the first to third cameras 2c to 2e be unitedly mounted on the driving apparatus 10. In this configuration, at least the pair of cameras (second and third cameras 2d and 2e) are moved in synchronization with each other.

Preferably, in the configuration, the first and second cameras 2a and 2b are mounted on the driver 10 such that the optical axes of their optical systems 4d and 4e are orthogonal to each other. Also, the second and third cameras 2d and 2e mounted on the driver 10 are disposed along a direction perpendicular to the longitudinal direction of the first and second optical fibers 50a and 50b, while the first shooting area (included in the observation area) on the reference surface P1 shoot by the second camera 2d and the second shooting area (included in the observation area) on the reference surface P1 shoot by the third camera 2e substantially coincide with each other.

Figure 12:
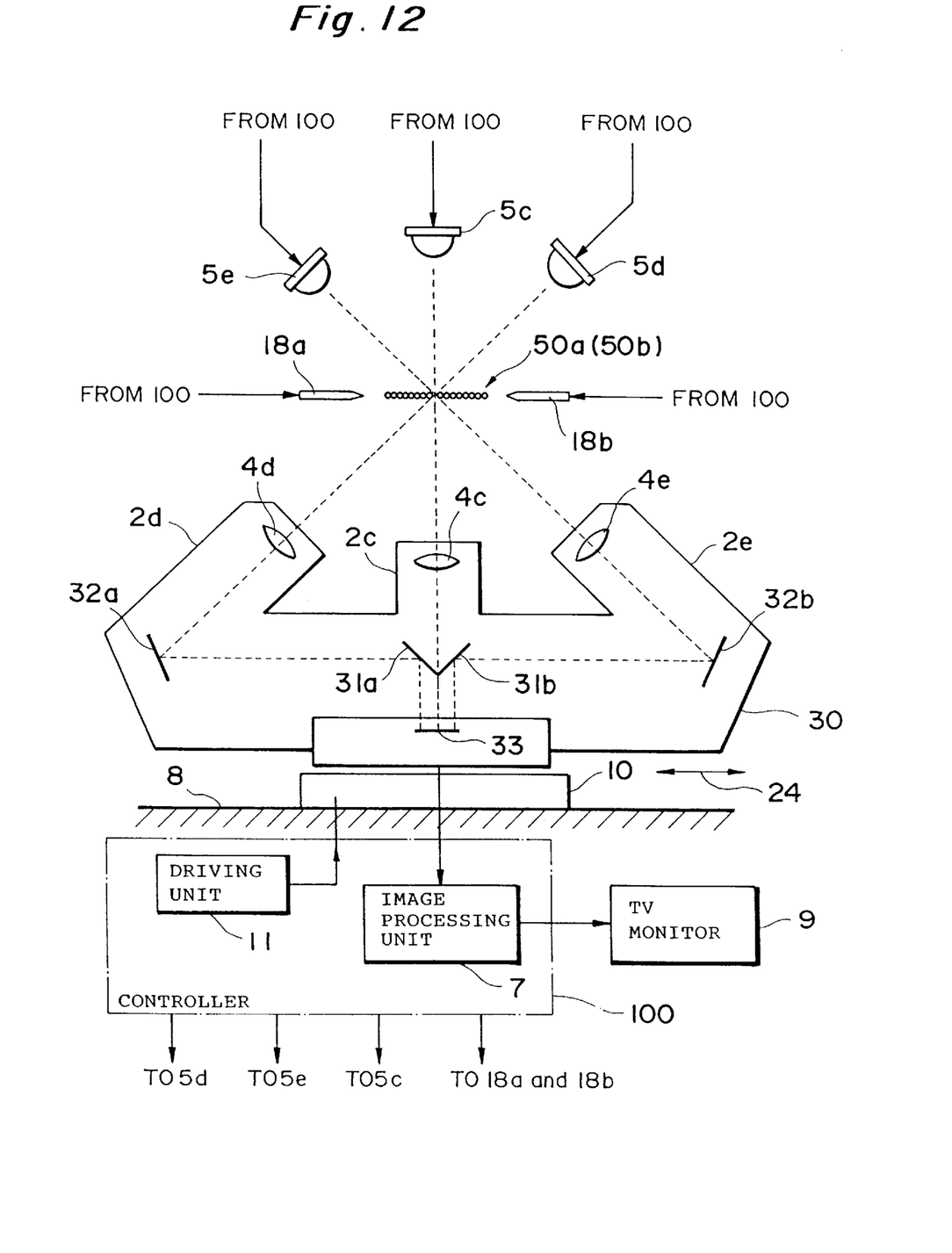
FIG. 12 is a view showing a part of the configuration of an observation apparatus realizing a second embodiment of the observation method in accordance with the present invention.

The observation apparatus shown in FIG. 12 further comprises a first light source 5c disposed at a position opposing the first camera 2c with respect to the reference surface P1, a second light source 5d disposed at a position opposing the second camera 2d with respect to the reference surface P1, and a third light source 5e disposed at a position opposing the third camera 2e with respect to the reference surface P1. Also, the observation apparatus comprises a light receiving section 33 for selectively taking out, as electric signals, a collective observation image data corresponding to the whole observation area on the reference surface P1 obtained by way of the optical system 4c of the first camera 2c and first and second local observation image data of the first and second shooting areas included in the observation area on the reference surface P1 respectively obtained by way of the optical systems 4d and 4e of the second and third cameras 2d and 2e.

Also, the observation apparatus comprises an image processing system including the monitor 9 for displaying, at least, an image of the observation area on the reference surface P1 and the image processing unit 7 for, at least, receiving the first local observation image data obtained by the second camera 2d and the second local observation image data obtained by the third camera 2e and forming, from thus received first and second local observation image data, a composite image to be displayed on the monitor 9.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, the observation methods (first and second embodiments) and observation apparatus in accordance with the present invention will be explained with reference to FIGS. 1 to 13.

FIG. 1 is a perspective view showing a configuration of a fiber ribbon fusion-splicing machine including an observation apparatus in accordance with the present invention. This fiber fusion-splicing machine comprises a first fiber holding member 15*a* for holding a first fiber ribbon 1*a* and a second fiber holding member 15*b* for holding a second fiber ribbon 1*b* which is to be fusion-spliced with the first fiber ribbon 1*a*. The first and second fiber holding members 15*a* and 15*b* are movable in directions indicated by arrows B1 and B2 by first and second motors 13*a* and 13*b* by way of rod screws 12*a* and 12*b*, respectively. Also, the tip portions of the fiber ribbons 1*a* and 1*b* are stripped of their coatings so as to expose first and second optical fibers 50*a* and 50*b*, respectively. Thus exposed tip portions of the first and second optical fibers 50*a* and 50*b* are positioned by first and second installation members 16*a* and 16*b* having V-shaped grooves 161*a* and 161*b*, respectively. The fiber fusion-splicing machine further comprises electrodes 18*a* and 18*b* opposing each other across the exposed optical fibers 50*a* and 50*b*, which are respectively disposed on the first and second installation members 16*a* and 16*b*, so as to fusion-splice together each set of the first and second optical fibers 50*a* and 50*b*, whose end faces butt each other, by discharge.

Further, the fiber fusion-splicing machine shown in FIG. 1 includes the observation apparatus in accordance with the present invention. The observation apparatus for realizing a first embodiment of the observation method (comprising a collective observation step and a local observation step) explained later comprises, as shown in FIG. 2 for example, at least, a guide 8 extending along faced surfaces 160*a* and 160*b* of the pair of installation members 16*a* and 16*b*; first and second drivers 10*a* and 10*b* which are movable on the guide 8; and a driving unit 11 for moving the first and second drivers 10*a* and 10*b* along directions in which the guide 8 extends (directions indicated by arrows C1 and C2 in the drawing). Also, the first driver 10*a* is loaded with a first microscope camera 2*a* having an optical system 4*a*, whereas the second driver 10*b* is loaded with a second microscope camera 2*b* having an optical system 4*b*. An observation image of each pair of the first and second optical fibers 50*a* and 50*b* whose end faces butt each other is obtained by the above-mentioned pair of the microscope cameras 2*a* and 2*b*.

Here, the respective optical systems 4*a* and 4*b* of the first and second microscope cameras 2*a* and 2*b* have a predetermined magnification. The first and second microscope cameras 2*a* and 2*b* are respectively mounted on the first and second drivers 10*a* and 10*b* such that the optical axes of their optical systems 4*a* and 4*b* are orthogonal to each other (see FIGS. 4 and 7).

Also, the first and second optical fibers 50*a* and 50*b* are respectively disposed on the V-shaped grooves 161*a* and 161*b* of the pair of installation members 16*a* and 16*b* so as to be placed on a predetermined reference surface P1 as shown in FIG. 3, while their end faces butt each other. Therefore, in the observation apparatus, a first light source 5*a* is disposed at a position opposing the first microscope camera 2*a* with respect to the reference surface P1, while a second light source 5*b* is disposed at a position opposing the second microscope camera 2*b* with respect to the reference surface P1.

Further, the first and second microscope cameras 2*a* and 2*b* are respectively equipped with light receiving sections 3*a* and 3*b* for taking out images of an observation area on the reference surface P1 as electric signals through the optical systems 4*a* and 4*b* with a predetermined magnification. Also, the observation apparatus comprises an image processing system including a monitor 9 for displaying, at least, an image of the observation area on the reference surface P1 and an image processing unit 7 for, at least, receiving a first image data obtained by the light receiving section 3*a* of the first microscope camera 2*a* and a second image data obtained by the light receiving section 3*b* of the second microscope camera 2*b* and forming, from thus received first and second image data, a composite image to be displayed on the monitor 9.

Here, at least the above-mentioned driving unit 11 and image processing unit 7 are included in a controller 100, which controls the light sources 5*a* and 5*b* during the observing operation and the electrodes 18*a* and 18*b* during the fusion-splicing operation. The driving unit 11 also drives and controls the motors 13*a* and 13*b* shown in FIG. 1.

In the following, the first embodiment of the observation method in accordance with the present invention will be explained with reference to FIGS. 4 to 11. Here, FIG. 4 is a view showing a schematic configuration of the observation apparatus for realizing the collective observation step in the first embodiment, whereas FIG. 7 is a view showing a schematic configuration of the observation apparatus for realizing the local observation step in the first embodiment. In the first embodiment, the movement control operations for the first and second microscope cameras 2*a* and 2*b* (directions for moving the respective microscope cameras) and the respective shooting areas of the first and second microscope cameras 2*a* and 2*b* on the reference surface P1 in the collective observation step are different from those in the local observation step.

Figure 6:
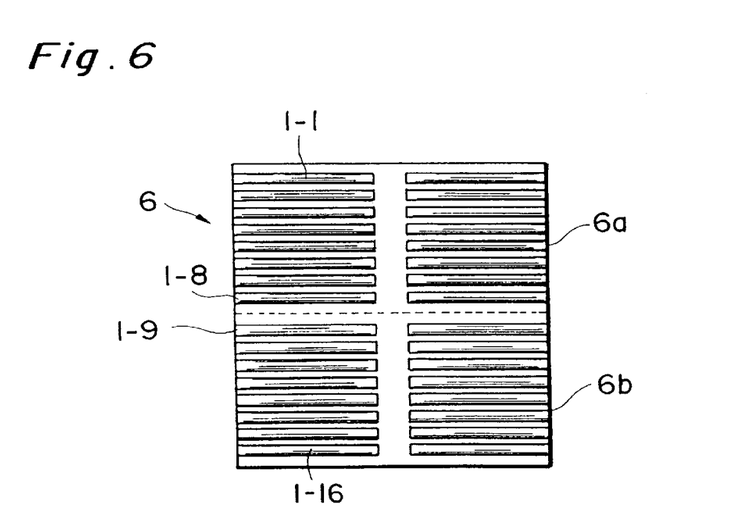

FIG. 5 is a view for explaining the collective observation step in the first embodiment, showing the shooting areas of the first and second microscope cameras 2*a* and 2*b* on the reference surface P1 on which the first and second optical fibers 50*a* and 50*b* are disposed. FIG. 6 is a view showing a monitor screen displaying a composite image 6 (image of the whole observation area) on the reference surface P1. This composite image 6 is combined by the image processing unit 7 from image data 6a and 6b of a predetermined shooting area of the reference surface P1 respectively captured by the first and second microscope cameras 2a and 2b.

Figure 9:
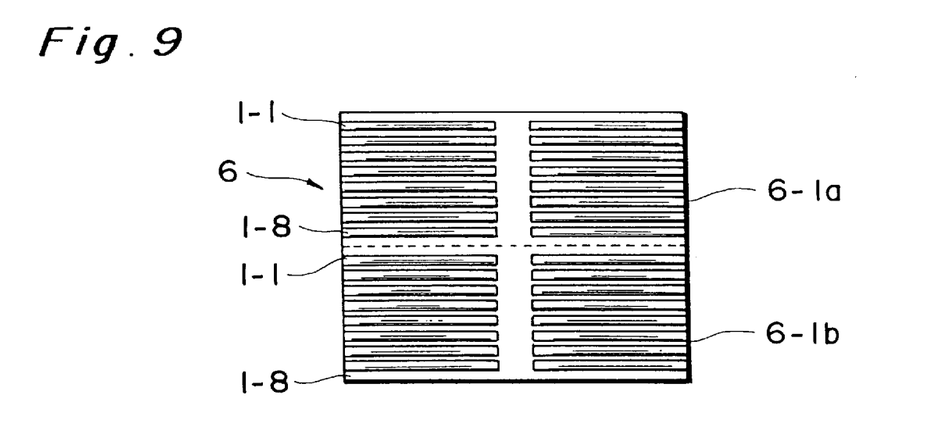
Figure 10:
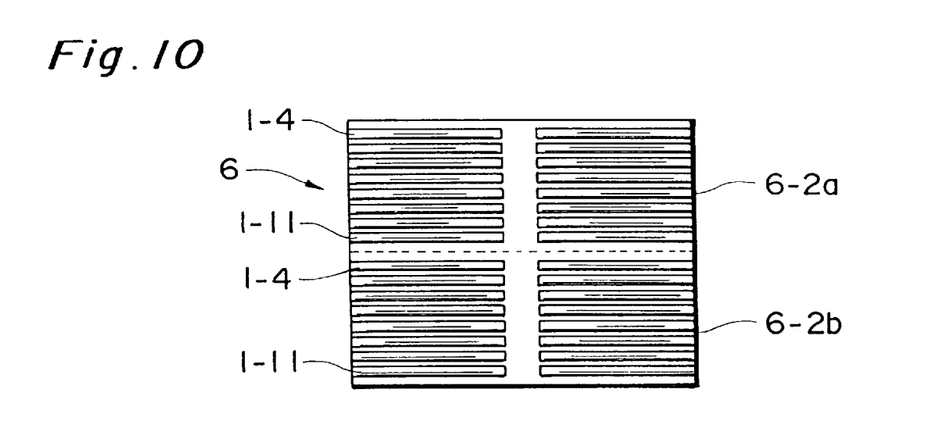
Figure 11:
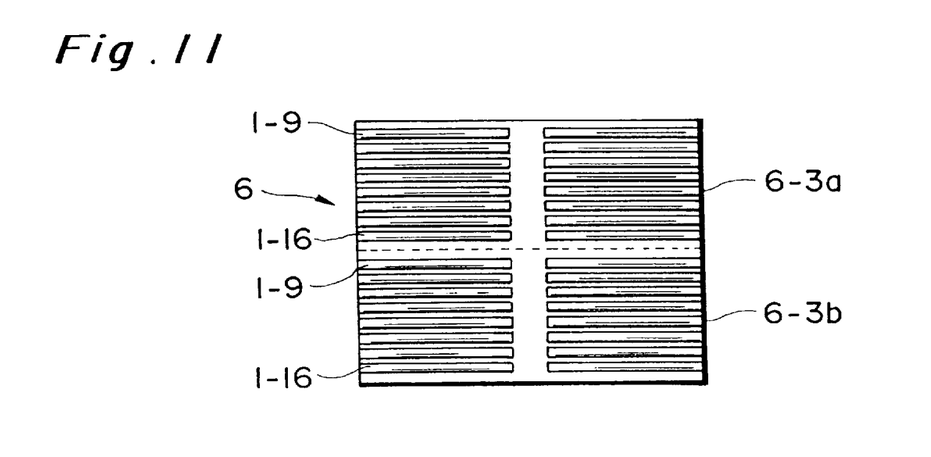

On the other hand, FIG. 8 is a view for explaining the local observation step in the first embodiment, showing the shooting areas of the first and second microscope cameras 2a and 2b on the reference surface P1 on which the first and second optical fibers 50a and 50b are disposed. FIGS. 9 to 11 are views respectively showing monitor screens displaying the composite images 6 (local observation images) on the reference surface P1. These composite images 6 are also combined by the image processing unit 7 from image data 6-1a to 6-3a and 6-1b to 6-3b of predetermined shooting areas on the reference surface P1 respectively captured by the first and second microscope cameras 2a and 2b.

Namely, while fiber ribbons with 16 optical fibers (1-1, . . . , 1-16) to be fusion-spliced are disposed on the reference surface P1 with their end faces butting each other, the observation apparatus shown in FIG. 4 comprises the first and second microscope cameras 2a and 2b, which are disposed obliquely with respect to the reference surface P1 with optical axes 23a and 23b of their respective optical systems 4a and 4b intersecting (normally at right angles). As mentioned above, this observation apparatus (shown in FIGS. 4 and 7) comprises the light sources 5a and 5b for illuminating the first and second optical fibers 50a and 50b butting each other; a pair of the microscope cameras 2a and 2b for picking up images of thus illuminated optical fibers 50a and 50b from two respective directions; the drivers 10a and 10b movable by the driving unit 11 in the direction of arrows C1 and C2 (so as to move the first and second microscope cameras 2a and 2b independently or simultaneously from one side (1-1) of the aligned optical fibers 50a and 50b toward the other side (1-16) across each of the fiber ribbons 1a and 1b); the image processing unit 7 for processing thus captured two-component composite image 6 (see FIG. 6); and the TV monitor 9 such as liquid crystal display, cathode ray tube (CRT) or the like for displaying thus processed composite image. Here, the pair of microscope cameras 2a and 2b may be moved across each of the optical fibers 50a and 50b either in different directions independently of each other (at the collective observation step; see FIG. 5) or in the same direction at the same speed (at the local observation step; see FIG. 8).

On the other hand, of the irradiation light beams from the light sources 5a and 5b, the light components respectively transmitted through the core and cladding of each of the butted optical fibers 50a and 50b from the two directions of the optical axes 23a and 23b vary according to the difference in refractive index therebetween, thereby an image of each of the optical fibers 50a and 50b is picked up by the pair of microscope cameras 2a and 2b.

At the collective observation step in the first embodiment, as shown in FIG. 5, one microscope camera 2a is controlled such that a shooting area 110a on the reference surface P1 is moved in the direction of arrow D1 indicated therein, so as to pick up at least an image of the half within the whole observation area. On the other hand, the other microscope camera 2b is controlled such that a shooting area 110b on the reference surface P1 is moved in the direction of arrow D2 indicated therein, so as to pick up at least an image of the remaining half within the whole observation area. Thus, in the collective observation step in the first embodiment, the image of the whole observation area is divisionally picked up by the pair of microscope cameras 2a and 2b. Here, of the respective shooting areas 110a and 110b of the microscope cameras 2a and 2b, 111a and 111b denote the effective areas displayed on the TV monitor 9. Also, 6a and 6b refer to the local observation images (respectively corresponding to the half regions of the whole observation area) picked up by the respective microscope cameras 2a and 2b.

At the local observation step in the first embodiment, on the other hand, as shown in FIG. 8, the microscope cameras 2a and 2b are simultaneously moved by the respective drivers 10a and 10b from the optical fiber 1-1 toward the optical fiber 1-16 across each of the fiber ribbons 1a and 1b. Namely, the shooting areas 110a and 110b of the respective microscope cameras 2a and 2b are simultaneously scanned at the same speed in the directions of arrows D1 and D2 indicated therein.

As mentioned above, at the collective observation step in the first embodiment, the whole observation area is divisionally shoot by the microscope cameras 2a and 2b, thereby each optical fiber is observed from only one direction. Accordingly, the position of each of the butted optical fibers cannot correctly be measured. When the images 6a and 6b respectively picked up by the microscope cameras 2a and 2b are combined together, however, the overall butting state (optical fibers 1-1 to 1-16) can be observed simultaneously (see FIG. 6). Accordingly, before a detailed position is measured, the overall state can be inspected so as to see, for example, whether or not there is a great obstacle such as loss in splicing ends which may cause poor splicing.

At the local observation step in the first embodiment, on the other hand, the two microscope cameras 2a and 2b simultaneously observe each optical fiber from the orthogonal directions 23a and 23b, thereby the position of each of the butted optical fibers can accurately be measured. FIGS. 9 to 11 are views showing states of this observation step. FIG. 9 shows the composite image 6 formed by the images 6-1a and 6-1b capturing the optical fibers 1-1 to 1-8 respectively from the orthogonal directions 23a and 23b. When the relative positions of the microscope cameras 2a and 2b with respect to the fiber ribbons 1a and 1b are moved toward the right side of the arrows C1 and C2 in FIG. 7, the composite image formed by the images 6-2a and 6-2b shown in FIG. 10 and the composite image formed by the images 6-3a and 6-3b shown in FIG. 11 are successively obtained as the microscope cameras 2a and 2b move from the optical fiber 1-1 toward the optical fiber 1-16. Nevertheless, the overall state cannot simultaneously be observed.

The light beams thus incident on the microscope cameras 2a and 2b are magnified by the optical systems 4a and 4b and then are photoelectrically converted into image data by the light receiving sections (image pick-up devices) 3a and 3b, respectively. Thus obtained analog image data are A/D-converted by the image processing unit 7 and then are stored in a memory. Based on these data, the controller 100 computes amounts of axial deviation and movement. Then, the controller 100 judges whether the amount of axial deviation is less than a tolerable level or not. When it is judged as less than the tolerable level, based on the above-mentioned amount of movement, the controller 100 controls the rotations of the motors 13a and 13b so as to actuate the optical fiber holding members 15a and 15b such that, while the optical fibers 50a and 50b advance, electric currents are supplied to the electrodes 18a and 18b so as to fusion-splice the optical fibers 50a and 50b together by discharge (see FIG. 1).

In the actual observation before and after the fusion-splicing, the above-mentioned collective observation step and local observation step are effected in combination. Namely, in the case where the fusion-splicing machine equipped with the above-mentioned observation apparatus is used for fusion-splicing fiber ribbons, initially, the first and second microscope cameras 2a and 2b respectively observe the abutting state of the optical fibers 1-1 to 1-8 and the abutting state of the optical fibers 1-9 to 1-16, thereby forming the image of the whole observation area (at the collective observation step; see FIG. 4). Then, the first and second microscope cameras 2a and 2b are simultaneously moved from the optical fiber 1-1 toward the optical fiber 1-16 across each of the fiber ribbons 1a and 1b (at the local observation step; see FIG. 7).

Thus, when the collective observation step and the local observation step are combined together, the abutting state of the optical fibers butting each other, as a whole, can initially be inspected, and then the pair of microscope cameras 2a and 2b can be used to accurately measure the relative positions of the individual optical fibers without changing the magnification of the optical system of each camera.

In the following, a second embodiment of the observation method in accordance with the present invention will be explained with reference to FIGS. 12 and 13. Here, FIG. 12 is a view showing a schematic configuration of an observation apparatus for realizing the second embodiment. As in the case of the first embodiment (see FIGS. 5 and 8), the second embodiment performs a step (collective observation step) of collectively observing all the sets of the first and second optical fibers 50a and 50b whose end faces butt each other and a step (local observation step) of partially observing the reference surface P1. Accordingly, the observation apparatus shown in FIG. 12 comprises a collective observation microscope camera 2c having an optical system 4c with a predetermined magnification for picking up an image of the whole observation area on the reference surface P1, and a pair of microscope cameras 2d and 2e respectively having optical systems 4d and 4e with a magnification greater than that of the optical system 4c of the collective observation microscope camera 2c.

Figure 13A:
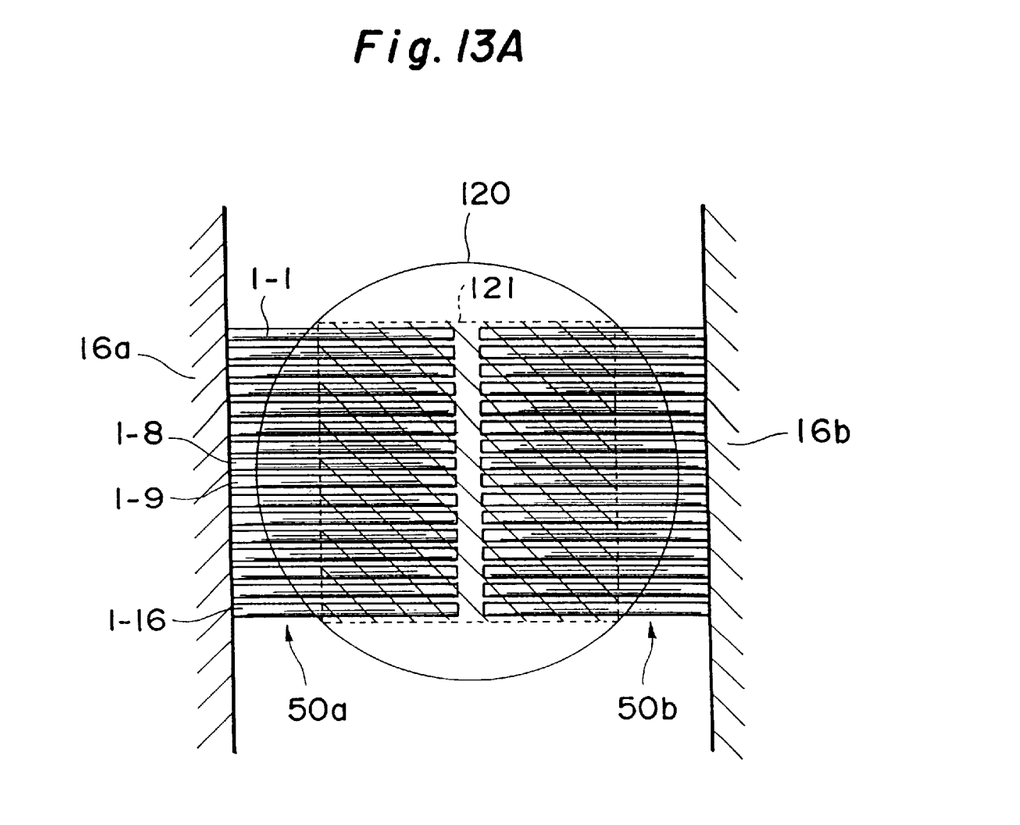
FIG. 13 is a view showing the whole observation area for explaining the second embodiment of the observation method in accordance with the present invention.
Figure 13B:
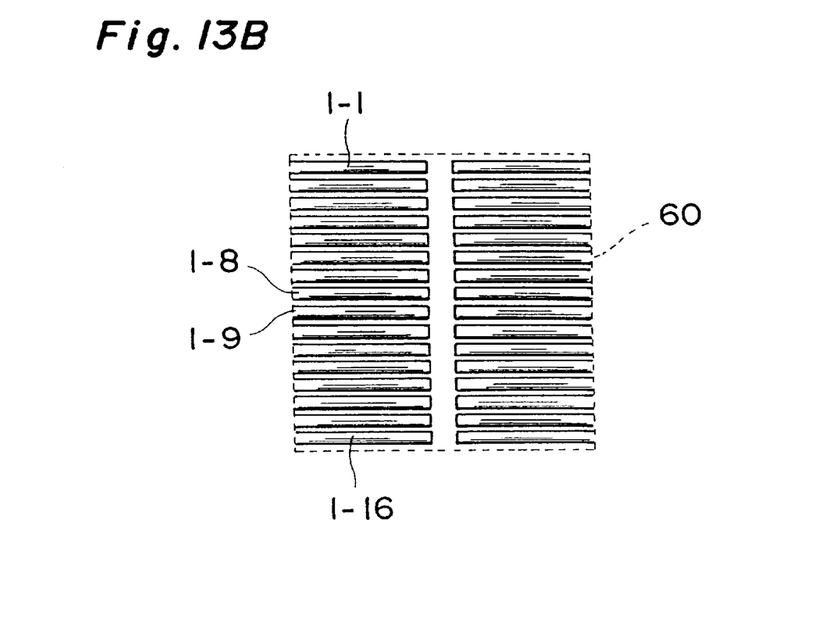

FIG. 13 is a view for explaining the collective observation step, showing the shooting area (corresponding to the whole observation area) of the collective observation microscope 2c on the reference surface P1. Here, the operation at the local observation step is similar to that in the above-mentioned first embodiment. Namely, the shooting areas and movement control operations of the pair of microscope cameras 2d and 2e are shown in FIG. 8. Also, the monitor screens in the local observation step in the second embodiment are shown in FIGS. 9 to 11.

The second embodiment is applied to cases where the filament number of the fiber ribbons 1a and 1b is so large that an overall image and a detailed image cannot be picked up by a microscope camera with a single magnification.

The observation apparatus shown in FIG. 12 comprises the microscope camera (collective observation microscope camera) 2c with a small magnification disposed in a direction perpendicular to the reference surface P1 in order to shoot all the butted optical fibers 50a and 50b, and the pair of microscope cameras 2d and 2e with a large magnification (respectively having the optical systems 4d and 4e with a magnification greater than that of the optical system 4c) obliquely disposed with respect to the reference surface P1 on both sides of the above-mentioned perpendicular direction. The microscope cameras 2c, 2d, and 2e are unitedly fixed to a lens barrel 30. The image formed through the optical system 4c with a small magnification is photoelectrically converted by an image pick-up device (light receiving section) 33 through two half mirrors 31a and 31b. Also, the images formed through the pair of optical systems 4d and 4e with a large magnification are combined together by the image pick-up device 33 respectively by way of mirrors 32a and 32b and the half mirrors 31a and 31b. Further, the microscope cameras 2c to 2e are disposed on a driver 10 for moving them across the optical fibers 50a and 50b.

Since the images picked up by the three microscope cameras 2c, 2d, and 2e are processed by the single image pick-up device 33, this observation apparatus is simple in configuration and is easy to handle.

In the case where the fusion-splicing machine equipped with the above-mentioned observation apparatus of the second embodiment is used for fusion-splicing the fiber ribbons 1a and 1b together, as shown in FIG. 13, the microscope camera 2c with a small magnification is initially used for picking up an image of the whole observation area. Then, the microscope cameras 2d and 2e with a large magnification are simultaneously moved from the optical fiber 1-1 to the optical fiber 1-16 so as to respectively pick up images (see FIGS. 8 to 11). Thus picked up two images are combined together by the single image pick-up device 33 so as to be observed.

The present invention is carried out in the modes explained in the foregoing and yields the following effects.

In the observation method and apparatus in accordance with the first embodiment, the state of the whole observation area can be inspected by a plurality of microscope cameras, and the relative positions of the respective sets of butting individual optical fibers can accurately be measured by the microscope cameras having the same magnification as those used for inspecting the whole observation area (without changing the magnification).

The observation method and apparatus in accordance with the second embodiment is simple in configuration and is easy to handle, since the images picked up by three microscope cameras are processed by a single image pick-up device. Further, even when the filament number of each of the fiber ribbons to be fusion-spliced increases, the time required for observation can be reduced.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 101355/1996 filed on Apr. 23, 1996 is hereby incorporated by reference.

What is claimed is:

1. A method of observing tip portions of optical fibers butting each other before and after splicing of said optical fibers, said method comprising:

disposing, while a tip portion of a first optical fiber and a tip portion of a second optical fiber to be spliced with said first optical fiber butt each other, the tip portions of said first and second optical fibers onto a predetermined reference surface; and shooting an observation area on said reference surface from directions different from each other while moving first and second cameras along a direction perpendicular to a longitudinal direction of said first and second optical fibers disposed on said reference surface, said first and second cameras respectively having optical systems with a predetermined magnification;

wherein said first camera shoots a first shooting area within said observation area, while said second camera concurrently shoots a second shooting area within said observation area.

2. A method according to claim 1, wherein said first and second cameras are moved along the same direction perpendicular to the longitudinal direction of said first and second optical fibers, while maintaining a state where said first and second shooting areas on said reference surface respectively shot by said first and second cameras overlap each other, said first and second shooting areas being included within said observation area on said reference surface.

3. A method according to claim 1, wherein said first and second cameras are moved along the direction perpendicular to the longitudinal direction of said first and second optical fibers, while maintaining a state where optical axes of said optical systems of said first and second cameras are orthogonal to each other.

4. An apparatus for observing tip portions of optical fibers butting each other before and after splicing of said optical fibers, said apparatus comprising:

a pair of installation members for holding, while a tip portion of a first optical fiber and a tip portion of a second optical fiber to be spliced with said first optical fiber butt each other, the tip portions of said first and second optical fibers such that the tip portions of said first and second optical fibers are disposed on a predetermined reference surface, said pair of installation members respectively having surfaces facing each other and perpendicular to a longitudinal direction of said first and second optical fibers;

first and second cameras for shooting an observation area on said reference surface respectively from directions different from each other, said first and second cameras respectively having optical systems with a predetermined magnification, wherein said first camera shoots a first shooting area within said observation area, while said second camera concurrently shoots a second shooting area within said observation area; and a driving system for moving said first and second cameras along a direction perpendicular to the longitudinal direction of said first and second optical fibers disposed on said reference surface.

5. An apparatus according to claim 4, wherein said driving system comprises:

a guide extending along the faced surfaces of said pair of installation members;

first and second drivers movable on said guide, said first and second drivers being respectively loaded with said first and second cameras; and a driving unit for moving said first and second drivers along a direction in which said guide extends.

6. An apparatus according to claim 5, wherein said first and second cameras are respectively disposed on said first and second drivers such that optical axes of said optical systems of said first and second cameras are orthogonal to each other.

7. An apparatus according to claim 4, wherein said first and second cameras are disposed along a direction perpendicular to the longitudinal direction of said first and second optical fibers.

8. An apparatus according to claim 4, further comprising:

a first light source disposed at a position opposing said first camera with respect to said reference surface; and a second light source disposed at a position opposing said second camera with respect to said reference surface.

9. An apparatus according to claim 4, wherein said first and second cameras respectively comprise light receiving sections for taking out images of the observation area on said reference surface as electric signals through said optical systems with a predetermined magnification.

10. An apparatus according to claim 9, further comprising an image processing system, said image processing system having:

a monitor for displaying, at least, an image of the observation area on said reference surface; and an image processing unit for, at least, receiving a first image data obtained by the light receiving section of said first camera and a second image data obtained by the light receiving section of said second camera and forming, from thus received first and second image data, a composite image to be displayed on said monitor.

11. A method of observing tip portions of optical fibers butting each other before and after splicing of said first and second optical fibers, said method comprising:

disposing, while a tip portion of a first optical fiber and a tip portion of a second optical fiber to be spliced with said first optical fiber butt each other, the tip portions of said first and second optical fibers onto a predetermined reference surface;

shooting an observation area on said reference surface, as a whole, including the tip portions of said first and second optical fibers by a first camera having an optical system with a predetermined magnification; and shooting said observation area from directions different from each other while moving second and third cameras along a direction perpendicular to a longitudinal direction of the first and second optical fibers disposed on said reference surface, said second and third cameras having optical systems with a magnification greater than the magnification of said optical system of said first camera, wherein said second camera shoots a first shooting area within said observation area while said third camera concurrently shoots a second shooting area in said observation area.

12. A method according to claim 11, wherein said second and third cameras are moved along the same direction perpendicular to the longitudinal direction of said first and second optical fibers, while maintaining a state where said first and second shooting areas on said reference surface respectively shot by said second and third cameras overlap each other.

13. A method according to claim 11, wherein said second and third cameras are moved along the direction perpendicular to the longitudinal direction of said first and second optical fibers, while maintaining a state where optical axes of said optical systems of said second and third cameras are orthogonal to each other.

14. An apparatus for observing tip portions of optical fibers butting each other before and after splicing of said optical fibers, said apparatus comprising:

a pair of installation members for holding, while a tip portion of a first optical fiber and a tip portion of a second optical fiber to be spliced with the said first optical fiber butt each other, the tip portions of said first and second optical fibers such that the tip portions of said first and second optical fibers are disposed on a predetermined reference surface, said pair of installation members respectively having surfaces facing each other and perpendicular to a longitudinal direction of said first and second optical fibers;

a first camera for shooting an observation area on said reference surface, as a whole, including the tip portions of said first and second optical fibers, said first camera having an optical system with a predetermined magnification;

second and third cameras for shooting said observation area on said reference surface respectively from directions different from each other, said second and third cameras respectively having optical systems with a magnification greater than the magnification of the optical system of said first camera, wherein said second camera shoots a first shooting area within said observation area, and said third camera shoots a second shooting area within said observation area concurrently with the shooting of said first camera; and a driving system for moving, at least, said second and third cameras along a direction perpendicular to the longitudinal direction of said first and second optical fibers disposed on said reference surface.

15. An apparatus according to claim 14, wherein said driving system comprises:

a guide extending along the faced surfaces of said pair of installation members;

a driver movable on said guide, said driver being loaded with said second and third cameras; and a driving unit for moving said driver along a direction in which said guide extends.

16. An apparatus according to claim 15, wherein said second and third cameras are disposed on said driver such that optical axes of the respective optical systems thereof are orthogonal to each other.

17. An apparatus according to claim 14, wherein said second and third cameras are disposed along the direction perpendicular to the longitudinal direction of said first and second optical fiber.

18. An apparatus according to claim 14, further comprising:

a first light source disposed at a position opposing said first camera with respect to said reference surface;

a second light source disposed at a position opposing said second camera with respect to said reference surface; and a third light source disposed at a position opposing said third camera with respect to said reference surface.

19. An apparatus according to claim 14, further comprising a light receiving section for selectively taking out, as electric signals, a collective observation image data corresponding to the whole observation area on said reference surface obtained by way of the optical system of said first camera and first and second local observation image data of the first and second shooting areas in said observation area respectively obtained by way of the optical systems of said second and third cameras.

20. An apparatus according to claim 19, further comprising an image processing system, said image processing system having:

a monitor for displaying, at least, an image of said observation area; and an image processing unit for, at least, receiving a first local observation image data obtained by said second camera and a second local observation image data obtained by said third camera and forming, from thus received first and second local observation image data, a composite image to be displayed on said monitor.

* * * * *